(12) United States Patent
Ahlstrom et al.

(10) Patent No.: US 8,194,671 B2
(45) Date of Patent: Jun. 5, 2012

(54) METHOD FOR REACTIVATING CONNECTIONS IN A CELLULAR TELEPHONY SYSTEM

(75) Inventors: Folke Ahlstrom, Västra Frölunda (SE); Lasse Olsson, Stenungsund (SE); Jan Backman, Käma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 322 days.

(21) Appl. No.: 12/521,280

(22) PCT Filed: Dec. 27, 2006

(86) PCT No.: PCT/SE2006/050629
§ 371 (c)(1), (2), (4) Date: Jun. 25, 2009

(87) PCT Pub. No.: WO2008/079068
PCT Pub. Date: Jul. 3, 2008

(65) Prior Publication Data
US 2010/0029287 A1 Feb. 4, 2010

(51) Int. Cl.
*H04L 12/56* (2006.01)
(52) U.S. Cl. ............ 370/392; 455/449; 455/435.1; 455/517; 370/352

(58) Field of Classification Search .......... 455/449, 455/435.1, 517; 370/392, 352
See application file for complete search history.

(56) References Cited

U.S. PATENT DOCUMENTS

| 2003/0103506 A1* | 6/2003 | Keller ............ 370/392 |
| 2005/0037792 A1* | 2/2005 | Rajkotia et al. ......... 455/517 |
| 2008/0039086 A1* | 2/2008 | Gallagher et al. ........ 455/435.1 |

* cited by examiner

*Primary Examiner* — Jean A Gelin
*Assistant Examiner* — Nathan Taylor

(57) ABSTRACT

A method for a cellular communications system (100) with a user (UE, 110) and a hierarchy of nodes between a UE (110) and an external network (150). The hierarchy comprises at least first (125) and second (130) nodes, and there can be a plurality of connections between the UE (110) and the network (150) via data channels (160) between the nodes, and plurality of data containers (170) with data regarding the data channels. A connection between a UE (110) and the external network (150) can be inactivated whilst the corresponding data container (170) is preserved, and an inactivated connection can be reactivated by the external network (150). When a connection is to be reactivated, the second node (130) utilizes information from the external network (150) in order to reactivate the data channel or channels which is/are concerned and which have had their data containers (170) preserved.

11 Claims, 2 Drawing Sheets

METHOD FOR REACTIVATING CONNECTIONS IN A CELLULAR TELEPHONY SYSTEM

TECHNICAL FIELD

The present invention discloses a method for use in a wireless cellular communications system. The system in which the invention can be applied can comprise at least one user, and has a hierarchy of nodes between a user and an external network which the user wishes to communicate with.

In the node hierarchy, there is at least a first and a second node, and in the system there can be a number of connections between the user and the external network via data channels between the first and second nodes. In the system, there is also a plurality of data containers which contain data regarding the data channels, and a connection between a user and the external network can be inactivated whilst the data container for the corresponding data channel is preserved.

An inactivated data channel can be reactivated by a request from the external network to said second node.

BACKGROUND

In wireless communication systems such as 3G systems, there can be a multitude of connections established between a user equipment, UE, such as a mobile telephone or computer, and an external network which the system connects the UE to, such as, for example, the Internet or a telephony or data network. For example, one such connection can be used for surfing the Internet, while another connection is used for watching video and a third connection is used for sending and receiving electronic mail.

In known systems, a connection will comprise a data channel between two nodes in the system, as well as a data channel between one of those nodes and the UE.

The connections between the UE and the external network can be inactivated by the system, for example if the UE is inactive longer than a predefined length of time. A connection which has been inactivated can be reactivated, for example by a request from the external network.

When a connection between a UE and an external network is initially activated, the data channels mentioned are established, together with data containers which contain data regarding the data channels between said two nodes. When a connection is inactivated, the data channels are released, but residues of the connection still remain in the system, such as, for example, the data containers.

When the external network wishes to activate an inactivated connection, the system will reactivate the data channels. However, in a situation where more than one connection has been inactivated, all of the data channels will be activated, which is undesirable with regard to, for example, resource utilisation both in the UE and in the system as such.

SUMMARY

As described above, there is thus a need for a solution in a wireless cellular communications system which will provide a more efficient resource utilization when a connection between a UE and an external network is reactivated, particularly in the case when more than one connection has been inactivated and it is desired to reactivate only a subset of those connections, for example one particular connection.

This need is addressed by the present invention in that it provides a method for use in a wireless cellular communications system, which system can comprise at least one user, UE, and which comprises a hierarchy of nodes between a UE and an external network which the UE wishes to communicate with.

The hierarchy comprises at least a first and a second node, and in the system there can be a first plurality of connections between the UE and the external network via data channels between said first and second nodes, and a second plurality of data containers which contain data regarding the data channels.

A connection between a UE and the external network can be inactivated in the system whilst the corresponding data container is preserved, and an inactivated connection can be reactivated by a request from the external network to the second node.

According to the method of the invention, when a connection is to be reactivated, the second node utilizes information from the external network in order to reactivate the data channel or channels which is/are concerned and which have had their data containers preserved.

Thus, by means of the method of the invention, a more efficient utilization of the system is achieved, since only those data channels which are actually needed are reactivated.

Suitably but not necessarily, the data containers are located in the second node.

In a preferred embodiment of the invention, an inactivated connection is reactivated by a request from the external network, which request comprises a paging of the UE in the system, following which the UE signals to the system, as a consequence of which said data channel/s is/are reactivated.

The invention is also directed towards a node with functionality according to the method.

BRIEF DESCRIPTION OF THE DRAWINGS

The invention will be described in more detail in the following, with reference to the appended drawings, in which.

DETAILED DESCRIPTION

The invention will be described in the following with reference to a 3G system of the WCDMA type, but it should be pointed out that this is by way of example only, and is in no way limiting regarding the scope of the invention.

Figure 1:
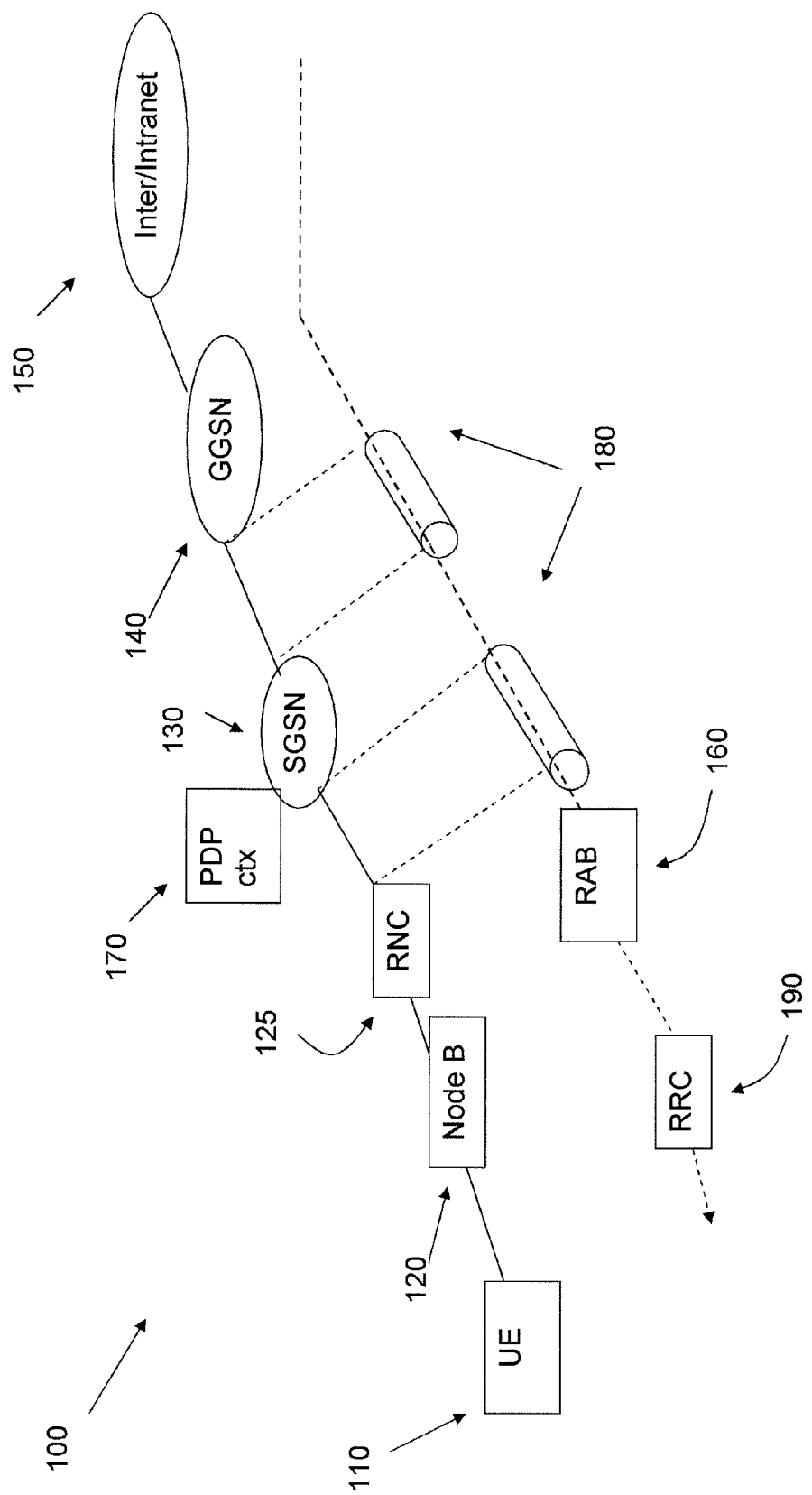
FIG. 1 shows a schematic overview of a system in which the invention may be applied.

FIG. 1 shows a schematic overview of a system 100 in which the invention may be applied. The system 100 is thus a 3G cellular wireless telephony system, and can comprise a number of users, referred to from now on as User Equipments, UE, and shown as 110 in FIG. 1. In some applications, the users are referred to as Mobile Stations, MS, so the term UE should not be construed as limiting the scope of the invention in any way.

The system 100 as such is hierarchical, i.e. the system comprises a number of nodes on different levels above the UE 110. In the system 100 which is shown as an example, the node closest to the UE is the so called Node B, 120, which in some systems is also referred to as the Radio Base Station or RBS.

The nodes above the Node B are, in rising order, the Radio Network Controller, RNC, 125, the Serving GPRS Support Node, SGSN, 130, and the Gateway GPRS Support Node, GGSN, 140.

The functions and roles of the RNC-SGSN-GGSN are well known to those skilled in the field, and will thus not be described in more detail here.

Also shown in FIG. 1 is an external network 150, which may be more or less any kind of external network to which the system 100 can connect the UE 110. As an example, the external network 150 is shown in FIG. 1 as the Internet or an Intranet.

In a system in which the invention may be applied, the UE can establish a number of so called connections to the external network 150 by means of the system 100. Each connection may serve a different purpose compared to the other connections which the UE has established, and examples of such different purposes which can be mentioned are sending and receiving electronic messages, surfing on the external network, watching video, etc.

In order to save resources, a connection between the UE and the external system 150 which has not been used by the UE 110 for a specified length of time may be deactivated automatically by the system. It is when such a deactivated connection is to be reactivated that the invention may be applied.

Before the invention is described in detail, some more details in the system will be described: for each connection between the UE 110 and the external system 150, the system establishes a data channel, referred to as a Radio Access Bearer, RAB, 160, between the RNC 125 and the SGSN 130. The Node B 120 connects the RAB 160 to the UE 110 via a data channel referred to as the RRC, Radio Resource Control, 190.

The RAB 160 is connected to the external system 150 through the SGSN and GGSN via a number of so called data tunnels 180. Also, as shown in FIG. 1, the system establishes so called Packet Data Control Contexts, PDP Contexts 170, which can be seen as data containers which contain data about each RAB. An example of data about a RAB which is held by its PDP Context is its Quality of Service, QoS, which contains the Traffic Class, the maximum bit rate (both in the uplink and downlink directions), the guaranteed bit rate, transfer delay, traffic handling priority, and the delivery order.

When a connection between the UE 110 and the external system 150 is deactivated due to inactivity in the UE, the RRC 190 and the RAB 160 for that connection are released, i.e. disconnected. However, the corresponding PDP Context 170 and the data tunnels 180 are preserved.

It can also be mentioned here that the GGSN also maintains a data context for the corresponding data connection to the SGSN, said data context also being preserved when the RRC and the RAB are released.

Figure 2:
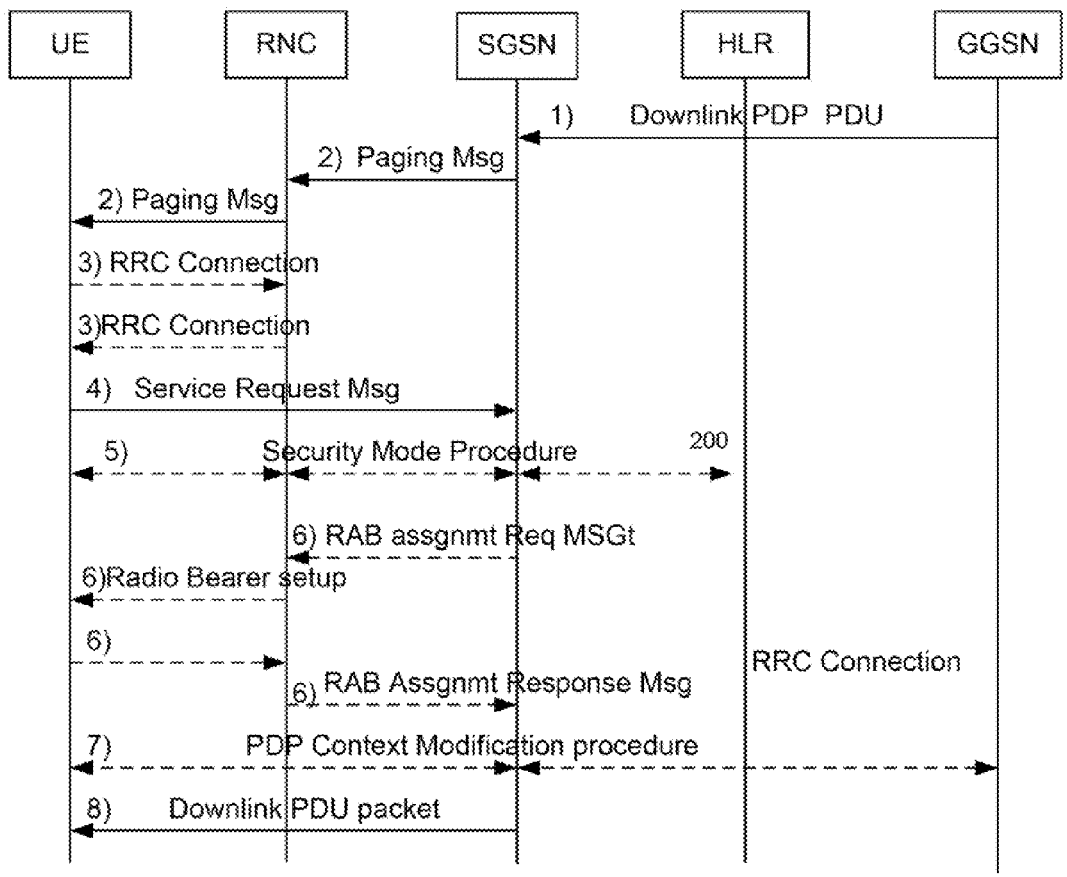
FIG. 2 shows a sequence diagram which may be used in the system of FIG. 1.

When it is desired to reactivate a connection which has been inactivated, the procedure shown in FIG. 2 is followed. FIG. 2 shows, apart from that which has been described above, the Home Location Register, HLR, which is a well known function in systems of the 3G kind, and which will thus not be described in more detail here.

In order not to obscure FIG. 2, the steps in the sequence of FIG. 2 are only shown with numerals (1-8) and arrows in the diagram of FIG. 2, said numerals being explained below. Steps which are not always carried out, i.e. which may be optional, are shown with dashed lines.

1) The SGSN receives a downlink PDP PDU (Protocol Data Unit) from the GGSN for a UE which is in an idle state, in the system of the example the so called PMM-IDLE state.
2) The SGSN sends a Paging message to the RNC. The RNC pages the UE by sending a Paging message to the UE.
3) The UE establishes an RRC connection if none exists.
4) The UE sends a Service Request message to the SGSN. The SGSN knows whether or not the downlink packet requires RAB establishment (e.g. downlink PDU) or not (e.g. Request PDP Context Activation or MT SMS).
5) The SGSN may perform a security mode procedure.
6) If resources for the PDP contexts are re-established, the SGSN sends a Radio Access Bearer Assignment Request message to the RNC. The RNC sends a Radio Bearer Setup to the UE. The UE responds by returning a Radio Bearer Setup Complete message to the RNC.

The RNC sends a Radio Access Bearer Assignment Response message to the SGSN in order to indicate that tunnels are established on the Iu interface, and Radio Access Bearers are established between the RNC and the UE.

7) For each RAB re-established with a modified QoS (Quality of Service) profile, the SGSN initiates a PDP Context Modification procedure to inform the UE and the GGSN of the new QoS profile for the corresponding PDP context.
8) The SGSN sends the downlink packet, the PDU.

In the scenario above, in step 6 of known systems, the SGSN 130 re-establishes or reactivates the RABs 160, of all of the inactivated connections between the UE 110 and the external system 150, and the corresponding RRCs 190 are reestablished by the RNC 125. However, this may not be necessary, since the event that led to the paging of the UE 110 by the external system 150 may only be relevant for one of the RABs 160, i.e. one of the inactivated connections. This leads to unnecessary utilization of resources in the UE 110 and in the system 150 as a whole.

According to the invention, the SGSN 130 uses the fact that it knows which RAB 160 and which PDP context that is affected by the event behind the paging request in order to only activate the RAB 160 which is concerned.

Thus, by means of the invention, a more efficient utilization of system resources in the system 100 is achieved.

The invention uses the fact that the SGSN 130 gets the "downlink PDU" in step 1 of FIG. 2, and as described above, on a tunnel 180 which is coupled to a specific PDP Context 170. By virtue of this fact, the SGSN knows exactly which RAB to reactivate, since there is a one-to-one relationship between each RAB 160 and each PDP Context 170.

In the system 100 shown as an example above, the data containers 170 are located in the SGSN 130. Naturally, the invention may be applied to systems in which the data containers are located in another node in the system.

Also, the event that leads to the reactivation of the connection may be another event than a downlink PDU from an external system, this should also be seen merely as an example.

The invention is not limited to the examples described above and shown in the appended drawings, but may be freely varied within the scope of the appended claims.

As an example, the examples shown above have shown what happens according to the invention when it is desired to reactivate one connection with one data channel. Naturally, the invention can be applied when reactivating any number of connections with any number of data channels.

The invention claimed is:

1. A method in a wireless cellular communications system, comprising a user equipment (UE), a hierarchy of nodes between the UE and an external network which the UE wishes to communicate with, said hierarchy comprising at least a first and a second node, a plurality of connections between the UE and the external network via data channels between said first and second nodes, and a plurality of data containers which contain data regarding the data channels, and in which system a connection from the plurality of connections between the UE and the external network is inactivated whilst the corresponding data container is preserved, and in which system the inactivated connection from the plurality of connections is reactivated by a request from the external network to said second node, the method comprising the steps:

the second node sending a Paging message to the UE via a Radio Network Controller (RNC), wherein the UE establishes a Radio Resource Control (RRC) connection and sends a Service Request to the second node;

the RNC node sending a Radio Access Bearer Assignment message to the second node;

the second node sending a downlink Protocol Data Unit packet to activate the Resource Access Bearer associated with the inactivated connection from the plurality of connections; and wherein the inactivated connection from the plurality of connections is reactivated by a request from the external network.

2. The method of claim 1, wherein the plurality of data containers are located in the second node.

3. The method of claim 1, applied to a 3G mobile telecommunication system.

4. The method of claim 3, wherein the first node is a Radio Network Controller (RNC) in the 3G system and the second node is a Serving GPRS Support Node (SGSN) in the 3G system.

5. The method of claim 3, wherein the data channel is a Radio Access Bearer (RAB) in the 3G system.

6. The method of claim 3, wherein the inactivated connection from the plurality of connections is reactivated by a downlink Protocol Data Unit (PDU) from the external network, and the information which is used by the SGSN to reactivate the proper RAB, is a data tunnel that the PDU is received by the SGSN.

7. A node in a wireless cellular communications system, which system comprises at least one user and which comprises a hierarchy of nodes between a User Equipment (UE) and an external network which the UE wishes to communicate with, said hierarchy comprising at least said node and one other node, in which system there is a first plurality of connections between the UE and the network via data channels between said one other node and said node, and a plurality of data containers which contain data regarding the data channels, and in which system a connection from the plurality of connections between the UE and the external network is inactivated whilst the corresponding data container is preserved, and in which system the inactivated connection from the plurality of connections is reactivated by a request from the external network to said node, the node comprising:

the other node sending a Paging message to the UE via a Radio Network controller (RNC), wherein the UE establishes a Radio Resource Control (RRC) connection and sends a Service Request to the other node;

the RNC node sending a Radio Access Bearer Assignment message to the other node;

the other node sending a downlink Protocol Data Unit packet to activate the Resource Access Bearer associated with the inactivated connection from the plurality of connections; and wherein the inactivated connection from the plurality of connections is reactivated by a request from the external network.

8. The node of claim 7, wherein the data containers are located in said node.

9. The node of claim 8, being used as the SGSN in the 3G system.

10. The node of claim 8, in which the data channel is the RAB in the 3G system.

11. The node of claim 9, in which the inactivated connection from the plurality of connections is reactivated by a downlink PDU from the external system, and the information which is used by the node to reactivate the corresponding RAB by means of a data tunnel that the PDU is received by the node.

\* \* \* \* \*

UNITED STATES PATENT AND TRADEMARK OFFICE
CERTIFICATE OF CORRECTION

PATENT NO. : 8,194,671 B2
APPLICATION NO. : 12/521280
DATED : June 5, 2012
INVENTOR(S) : Ahlström et al.

It is certified that error appears in the above-identified patent and that said Letters Patent is hereby corrected as shown below:

On the Face Page, in Field (12), under "United States Patent", in Column 1, Line 1, delete "Ahlstrom" and insert -- Ahlström --, therefor.

On the Face Page, in Field (75), under "Inventors", in Column 1, Line 1, delete "Ahlstrom," and insert -- Ahlström, --, therefor.

On the Face Page, in Field (75), under "Inventors", in Column 1, Line 3, delete "Käma" and insert -- Kärna --, therefor.

In Column 6, Line 13, in Claim 7, delete "controller" and insert -- Controller --, therefor.

Signed and Sealed this
Thirteenth Day of November, 2012

David J. Kappos
*Director of the United States Patent and Trademark Office*